United States Patent
Zhao et al.

(10) Patent No.: US 10,814,727 B2
(45) Date of Patent: Oct. 27, 2020

(54) REGENERATIVE VEHICLE BRAKING WITH WHEEL SLIP CONTROL AND YAW STABILITY CONTROL

(71) Applicant: Ford Global Technologies, LLC, Dearborn, MI (US)

(72) Inventors: Yanan Zhao, Ann Arbor, MI (US); Ming Lang Kuang, Canton, MI (US); Dale Scott Crombez, Livonia, MI (US); Walter Joseph Ortmann, Saline, MI (US); Xiaoyong Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 15/871,714

(22) Filed: Jan. 15, 2018

(65) Prior Publication Data

US 2019/0217709 A1    Jul. 18, 2019

(51) Int. Cl.

| | |
|---|---|
| *B60L 7/18* | (2006.01) |
| *B60L 7/26* | (2006.01) |
| *B60L 15/20* | (2006.01) |
| *B60T 8/172* | (2006.01) |
| *B60T 8/1755* | (2006.01) |
| *B60T 8/1761* | (2006.01) |
| *B60T 13/74* | (2006.01) |

(52) U.S. Cl.
CPC ............ *B60L 7/18* (2013.01); *B60L 7/26* (2013.01); *B60L 15/2009* (2013.01); *B60T 8/172* (2013.01); *B60T 8/1761* (2013.01); *B60T 8/17551* (2013.01); *B60T 13/741* (2013.01); *B60L 2240/423* (2013.01); *B60L 2240/54* (2013.01); *B60T 2250/03* (2013.01); *B60T 2270/12* (2013.01); *B60T 2270/302* (2013.01); *B60T 2270/602* (2013.01); *B60T 2270/604* (2013.01); *B60T 2270/613* (2013.01); *Y10S 903/947* (2013.01)

(58) Field of Classification Search
CPC .......... B60L 7/18; B60L 7/26; B60L 15/2009; B60T 8/172; B60T 8/17551; B60T 8/1761
See application file for complete search history.

(56) References Cited

U.S. PATENT DOCUMENTS

| | | | |
|---|---|---|---|
| 8,989,981 B2 * | 3/2015 | Yamakado | B60T 8/1755 701/72 |
| 9,199,639 B2 | 12/2015 | Yamakado et al. | |
| 10,421,362 B2 * | 9/2019 | Hall | B60T 8/171 |
| 2002/0036429 A1 | 3/2002 | Shimada et al. | |
| 2012/0049617 A1 * | 3/2012 | Furuyama | B60T 8/1766 303/9.75 |
| 2013/0030601 A1 * | 1/2013 | Yoon | B60W 10/184 701/1 |
| 2013/0218388 A1 | 8/2013 | Katsuyama | |
| 2016/0280191 A1 * | 9/2016 | Okano | B60T 8/17 |
| 2017/0183008 A1 * | 6/2017 | Isono | B60W 30/188 |

* cited by examiner

*Primary Examiner* — Anne Marie Antonucci
*Assistant Examiner* — Abdalla A Khaled
(74) *Attorney, Agent, or Firm* — David Kelley; McCoy Russell LLP

(57) ABSTRACT

Methods and systems are provided for operating a hybrid vehicle during operating conditions where vehicle braking is requested. In one example, regenerative braking is allocated to vehicle wheels responsive to actual and estimated vehicle yaw. Additionally, friction braking torque is allocated to vehicle wheels responsive to requested braking torque and regenerative braking torques.

7 Claims, 8 Drawing Sheets

REGENERATIVE VEHICLE BRAKING WITH WHEEL SLIP CONTROL AND YAW STABILITY CONTROL

FIELD

The present description relates generally to methods and systems for controlling regenerative braking of a hybrid vehicle. The methods and systems may be particularly useful for four wheel drive hybrid vehicles.

BACKGROUND/SUMMARY

A hybrid vehicle may include one or more electric machines to provide propulsive force to accelerate the hybrid vehicle. The electric machines may supply a portion of a requested driver demand torque and an internal combustion engine may provide a remainder of the requested driver demand torque. The electric machines may provide torque to front and rear wheels of the hybrid vehicle. The electric machines may also provide a negative or regenerative braking torque whereby vehicle wheels may be slowed. The regenerative braking torque may store kinetic energy from the vehicle as electrical energy, and the stored electrical energy may be used at a later time to accelerate the hybrid vehicle. Each of the vehicle's wheels may have a different capable friction torque (e.g., an upper threshold amount of torque or a maximum amount of torque not to be exceeded) the wheel may provide to the road surface without the wheels slipping. Each wheel's capable friction force may depend on conditions such as the normal force applied to the wheel, tire composition, road surface, and load transferred to the wheel during cornering. However, if a different regenerative braking torque is applied to each vehicle wheel, a yaw moment may be generated that degrades vehicle stability. Therefore, it may be desirable to provide regenerative braking while maintaining a desired level of vehicle stability.

The inventors herein have recognized the above-mentioned issues and have developed a vehicle operating method, comprising: receiving inputs to a controller and estimating yaw rate of a vehicle according to a model via the controller; providing a feedforward control parameter via the estimated yaw rate; and commanding a first electric machine to generate a first regenerative braking torque responsive to the feedforward control parameter.

By providing regenerative braking torque that is responsive to a feedforward control parameter, it may be possible to provide the technical result of increasing regenerative braking while reducing the possibility of undesirable vehicle yaw rates. In particular, the feedforward control parameter may improve regenerative braking response while limiting vehicle yaw. Further, feedback control of the regenerative braking torque may also be applied to more precisely control vehicle yaw when regenerative braking is provided. As such, vehicle yaw may be controlled while achieving higher levels of regenerative braking so that a greater amount of the vehicle's kinetic energy may be captured and stored for subsequent use.

The present description may provide several advantages. Specifically, the approach may improve conversion of a vehicle's kinetic energy into electric energy. Further, the approach may reduce the possibility of undesirable vehicle yaw rates. Additionally, the approach may be performed with or without feedforward torque compensation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
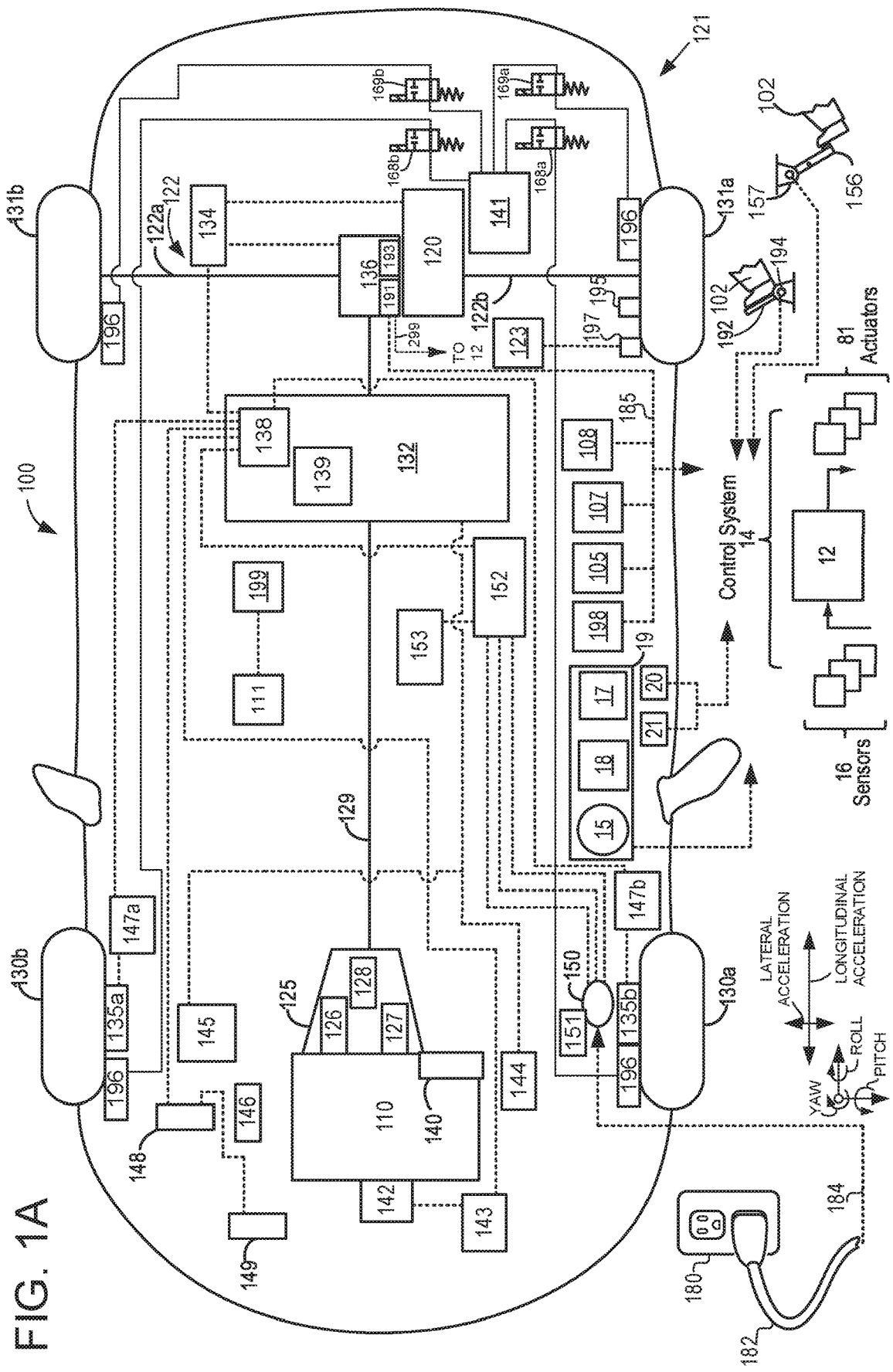
FIG. 1A is a schematic diagram of a hybrid vehicle driveline.
Figure 4:
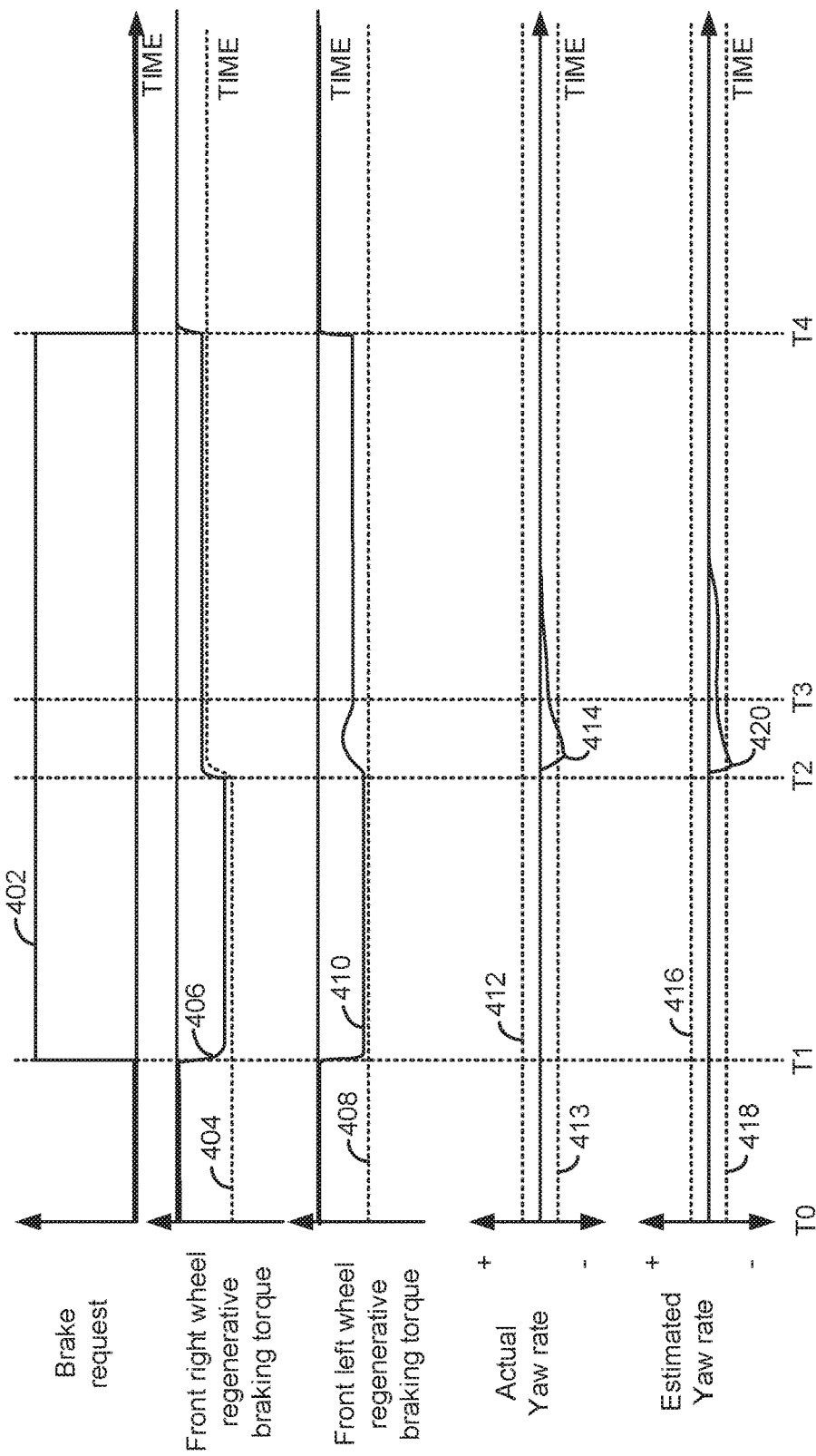
FIG. 4 shows prophetic vehicle operating sequence according to the method of FIGS. 3A-3D.

The following description relates to systems and methods for operating a driveline of a hybrid vehicle. FIGS. 1A-2 show an example hybrid vehicle system that includes a driveline with an internal combustion engine, an integrated starter/generator, a dual clutch transmission, and electric machines mechanically coupled to each vehicle wheel. FIGS. 3A-3D shows a method for controlling hybrid vehicle regenerative braking, and the method includes compensating for vehicle wheel slip and vehicle yaw. FIG. 4 shows an example vehicle operating sequence according to the method of FIGS. 3A-3D.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122*a*, and second half shaft 122*b*. Vehicle propulsion system 100 further has front wheels 130*a* (left) and 130*b* (right) and rear wheels 131*a* (left) and 131*b* (right). In this example, front wheels 130*a* (left) and 130*b* (right) may be electrically driven and rear wheels 131*a* (left) and 131*b* (right) are driven electrically or via engine 110. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion.

Rear drive unit 136 may transfer power from engine 110 or electric machine 120, to axle 122, resulting in rotation of drive wheels 131a (left) and 131b (right). Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131a (left) and 131b (right). Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131a (left) and 131b (right). As will be discussed in further detail below with regard to FIG. 2, transmission 125 may shift gears by selectively opening and closing first clutch 126 and second clutch 127.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc.

Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an a give suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131a (left) and 131b (right) and configured to monitor a pressure in a tire of wheel 131a (left) and 131b (right). While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130a (left) and 130b (right), 131a (left) and 131b (right)) may maintain tractive contact with the road surface according to driver inputs while braking, which may thus prevent the wheels from locking up, to prevent skidding. In some examples, BSCM may receive input from wheel speed sensors 195. BSCM may selectively monitor and activate anti-lock braking regulation valves 168a-169b. Anti-lock braking regulation valves 168a-168b adjust hydraulic pressure applied to brakes 196 of front wheels 130a (left) and 130b (right). Anti-lock braking regulation valves 169a-169b adjust hydraulic pressure applied to brakes 196 of rear wheels 131a (left) and 131b (right).

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130a (left) and 130b (right). Friction brakes 196 may be applied to slow front wheels 130a (left) and 130b (right). Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147b may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130a (left) and 130b (right).

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3A-3D.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine. The controllers (e.g., 12, 111b, 139, etc.) receive signals from the various sensors of FIGS. 1A-2 and employ the various actuators of FIGS. 1A-2 to adjust vehicle operation based on the received signals and instructions stored in memory of the controllers.

Figure 1B:
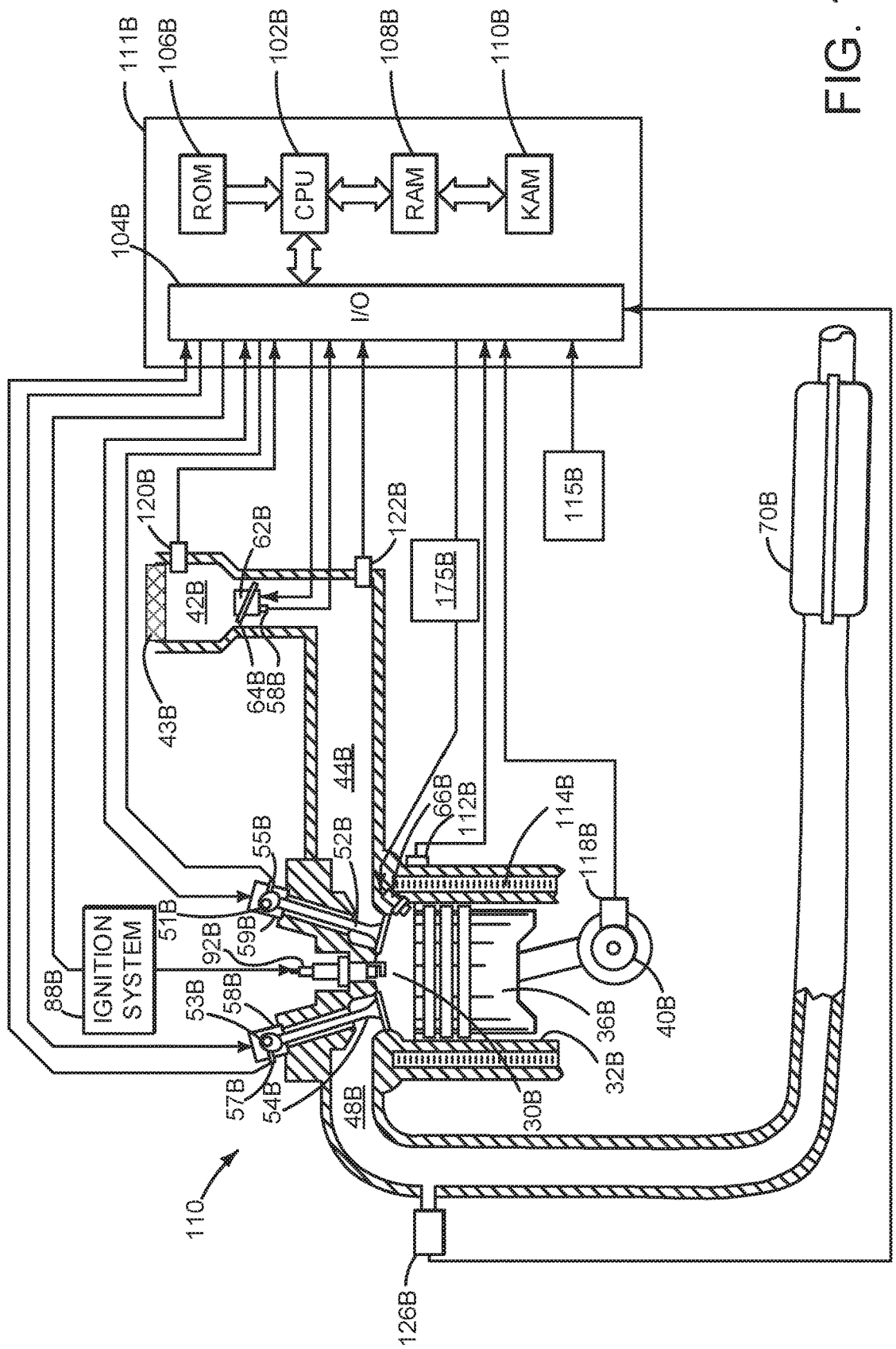
FIG. 1B is a sketch of an engine of the hybrid vehicle driveline.
Figure 2:
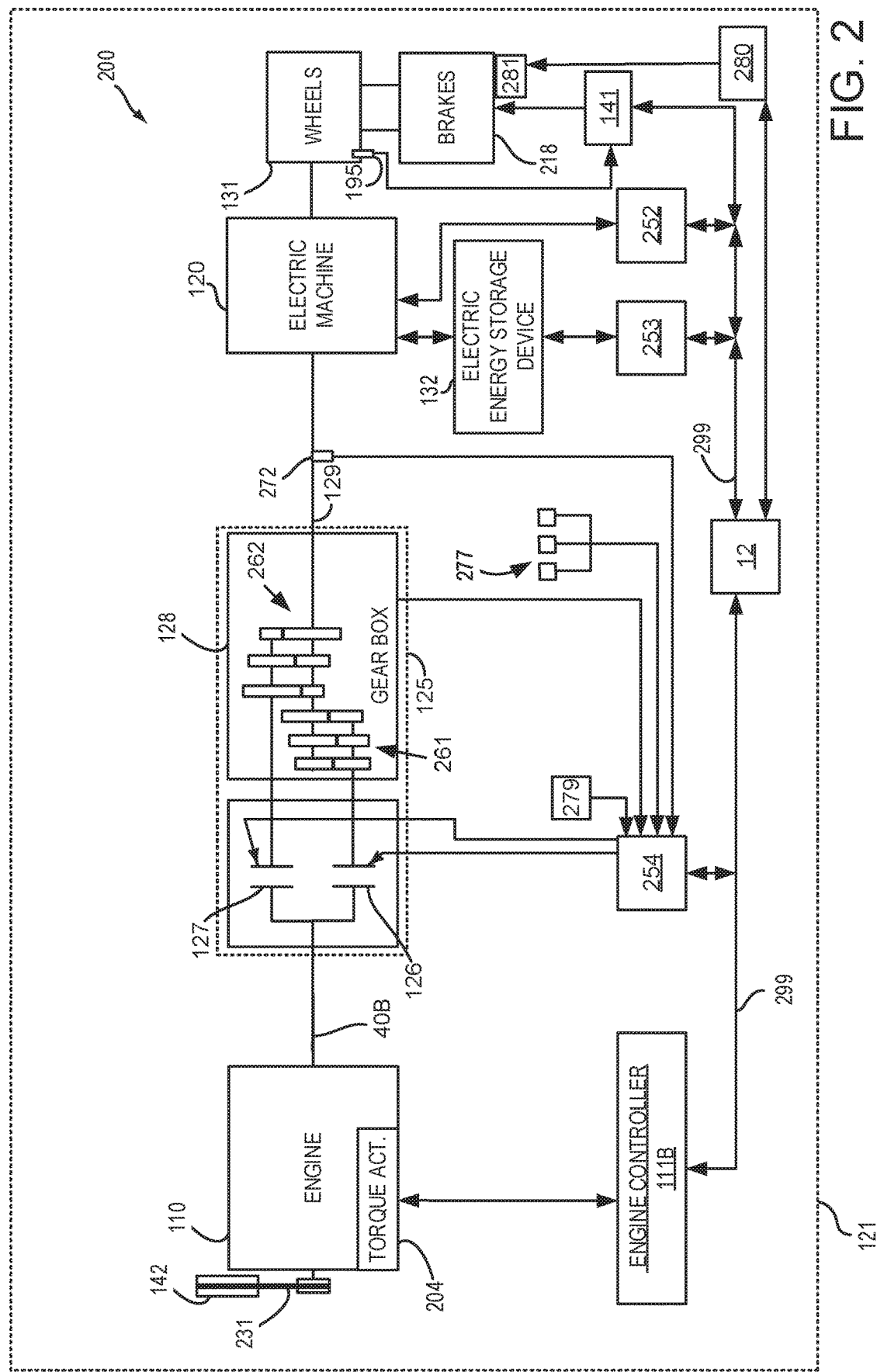
FIG. 2 is a schematic diagram of the hybrid vehicle driveline including controllers of various driveline components.
Figure 3A:
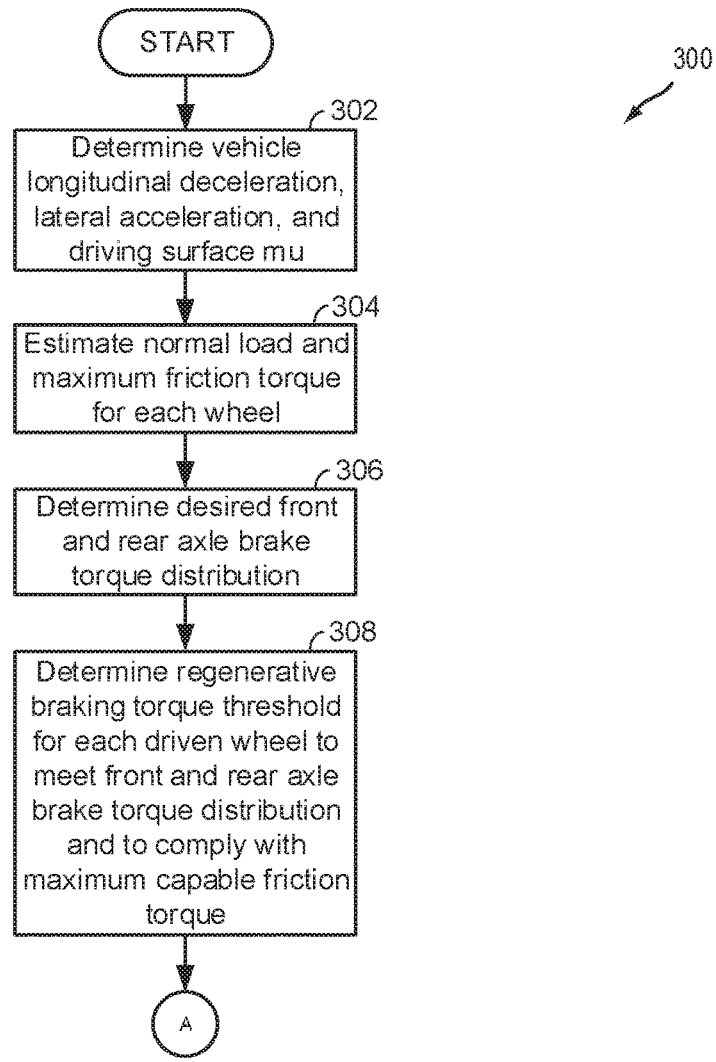
FIGS. 3A-3D show a flowchart of a method for controlling braking of a hybrid vehicle.
Figure 3B:
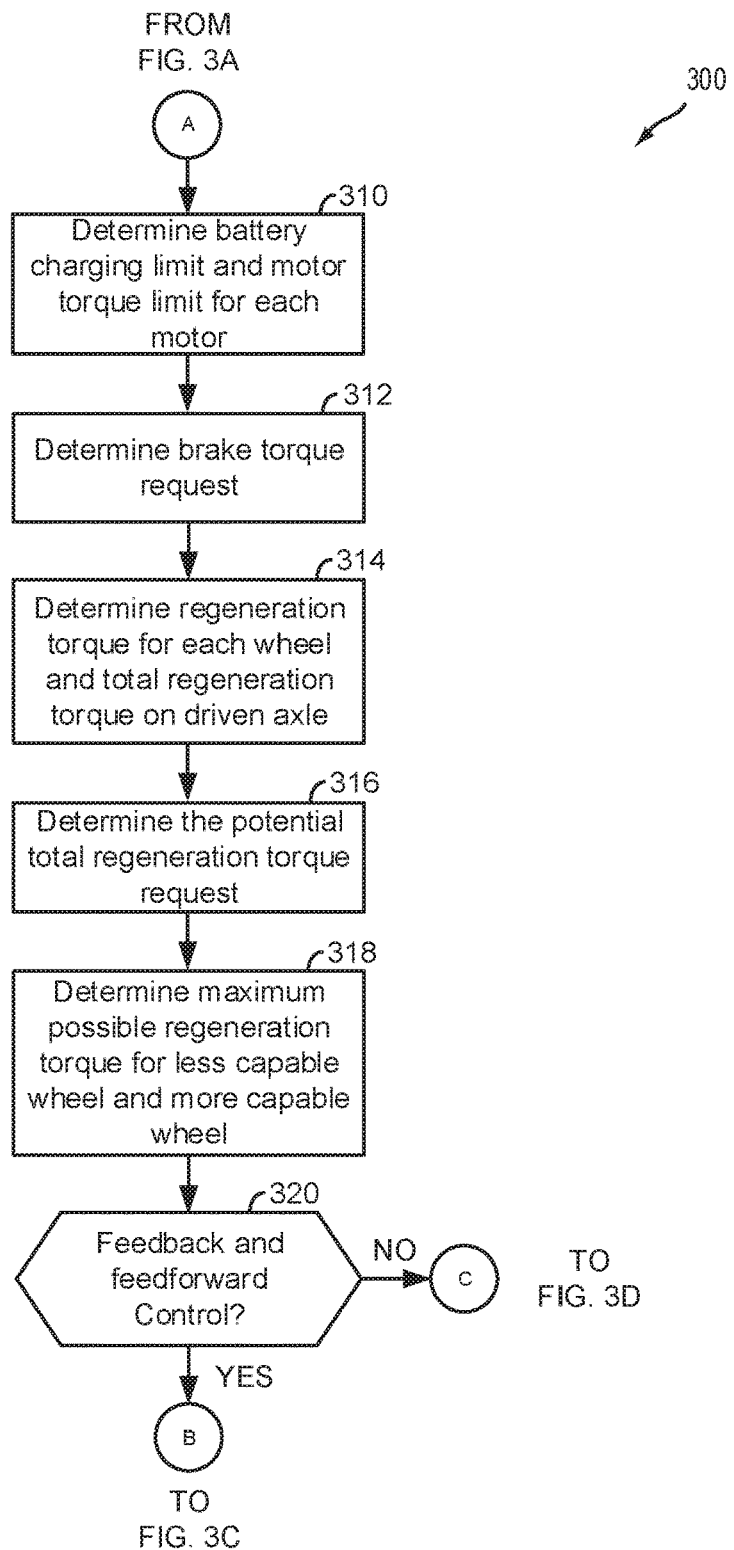
Figure 3C:
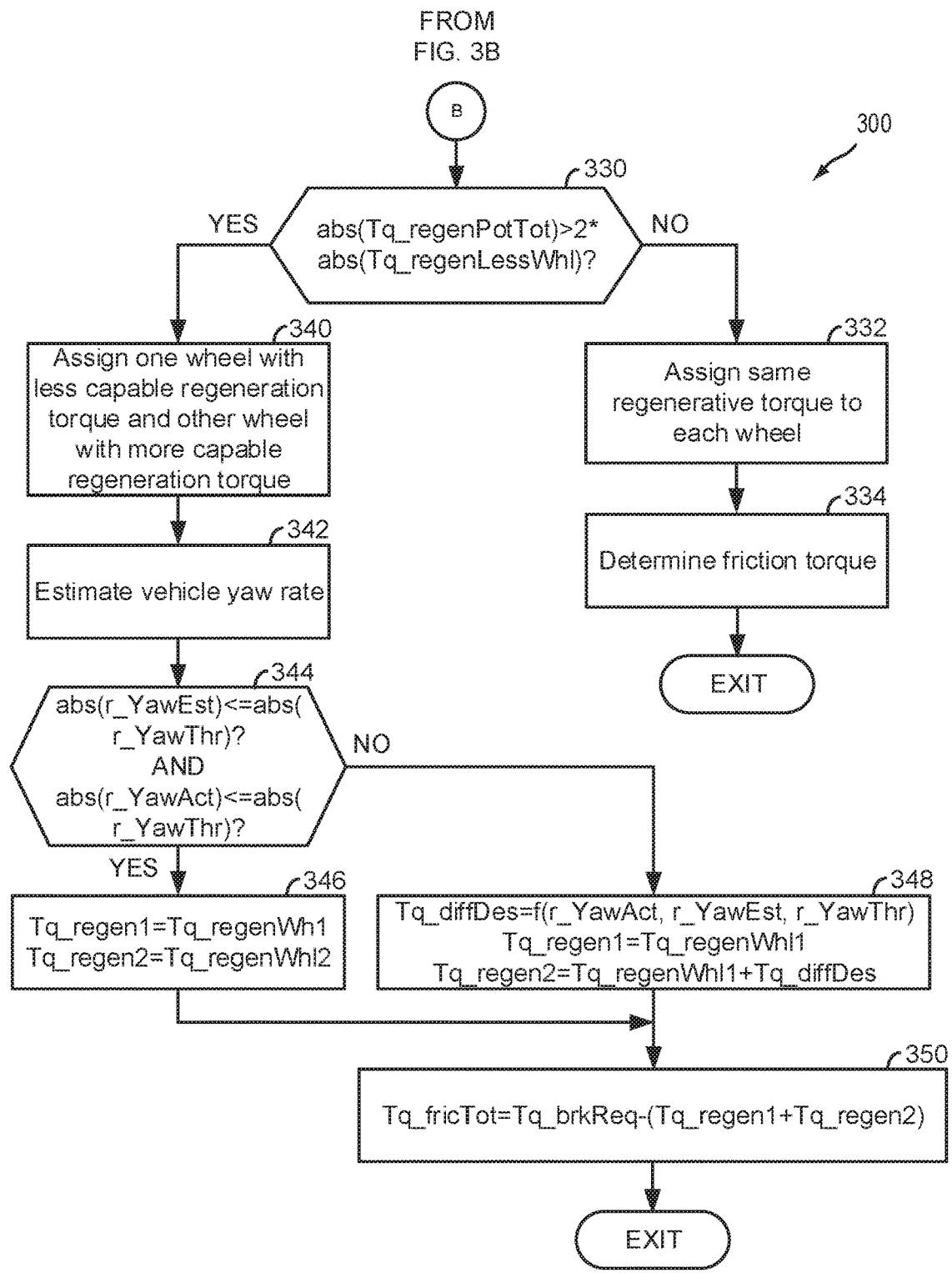
Figure 3D:
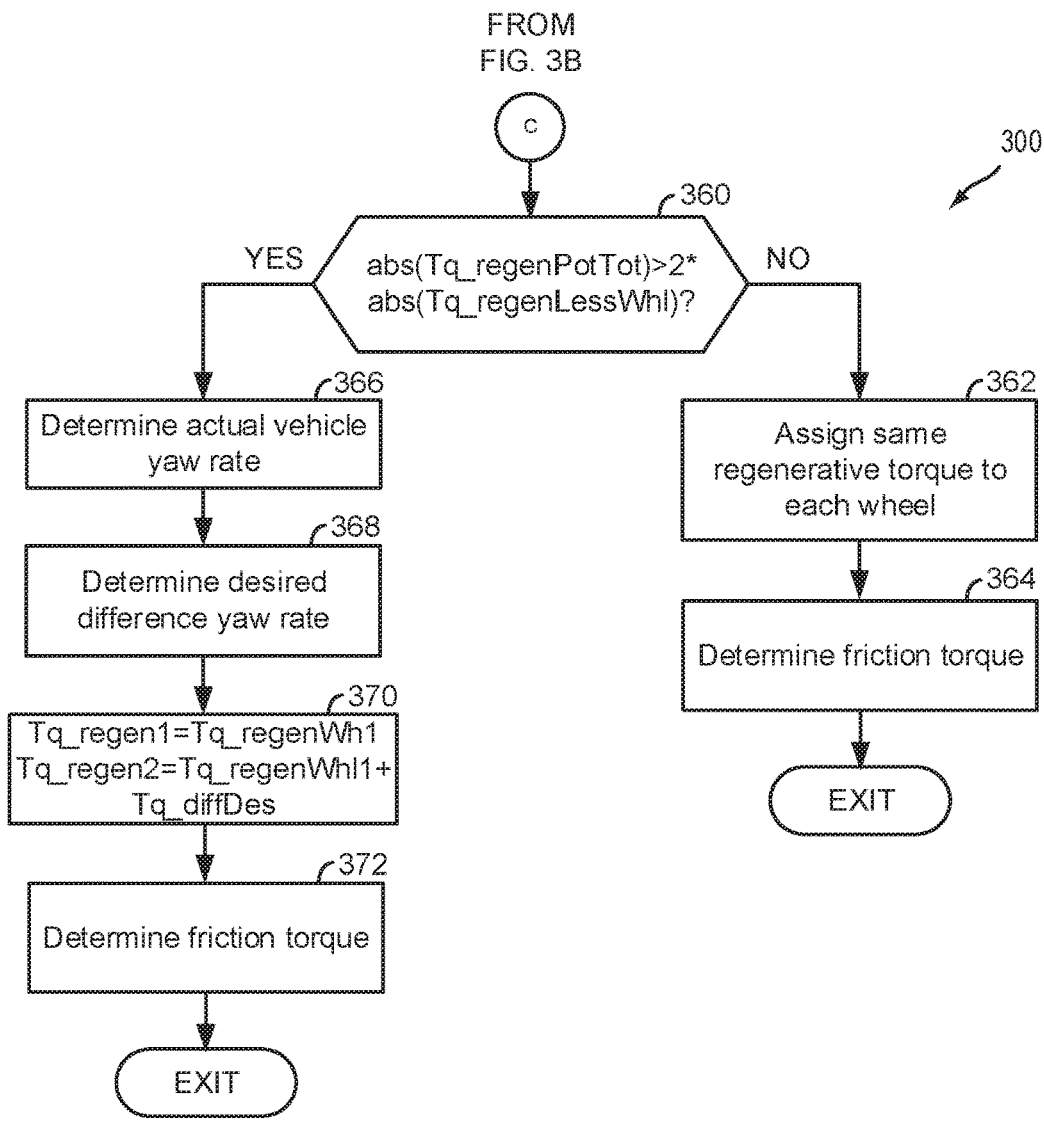

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of vehicle 121 including a powertrain or driveline 200. The powertrain of FIG. 2 includes engine 110 shown in FIGS. 1A and 1B. Other components of FIG. 2 that are common with FIGS. 1A and 1B are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the brake regulation torque at vehicle wheels 131a (left) and 131b (right).

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131a (left) and 131b (right). Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131a (left) and 131b (right) and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131a (left) and 131b (right) by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131a (left) and 131b (right) by disengaging wheel brakes 218 in response to the driver releasing his foot from a brake pedal, brake controller instructions, and/or vehicle system controller instructions and/or information. For example, vehicle brakes may apply a frictional force to wheels 131a (left) and 131b (right) via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 and electric machines 135a and 135b shown in FIG. 1A by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131a (left) and 131b (right) in a direction starting at engine 110 and ending at wheels 131a (left) and 131b (right). Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Thus, the system of FIGS. 1A-2 provides for a vehicle system, comprising: a first electric machine; a second electric machine; and a controller including executable instructions stored in non-transitory memory to generate a first braking torque via the first electric machine responsive to a braking stability threshold of a first wheel, and generate a second braking torque via the second electric machine responsive to actual vehicle yaw while providing the first braking torque. The vehicle system includes where the first electric machine is coupled to a first wheel and where the second electric machine is coupled to a second wheel. The vehicle system further comprises additional instructions to generate the second braking torque responsive to estimated vehicle yaw. The vehicle system includes where the first electric machine is coupled to a first front vehicle wheel. The vehicle system includes where the second electric machine is coupled to a second front vehicle wheel. The vehicle system further comprises additional instructions to adjust friction brakes responsive to a requested braking torque and the first and second braking torques.

Referring now to FIGS. 3A-3D, an example method to provide regenerative braking is shown. Regenerative braking may be provided via all four vehicle wheels via one or more electric machines. The method of FIGS. 3A-3D may be incorporated into and may cooperate with the system of FIGS. 1A-2. Further, at least portions of the method of FIGS. 3A-3D may be incorporated as executable instructions stored in non-transitory memory of a controller while other portions of the method may be performed via the controller transforming operating states of devices and actuators in the physical world. The friction braking torques and regenerative braking torques described in the method of FIGS. 3A-3D may be applied to reduce speed of a wheel. Instructions for carrying out method 300 may be executed by a controller based on instructions stored in memory of the controller and in conjunction with signals received from sensors of the engine system, such as the sensors described above with reference to FIGS. 1A-2. The controller may employ engine actuators of the engine system to adjust engine operation, according to the methods described below.

At 302, method 300 determines vehicle longitudinal deceleration, lateral acceleration, and driving surface mu (e.g., coefficient of friction). Longitudinal deceleration and lateral acceleration may be determined via inertial sensors 199. Method 300 estimates driving surface coefficient of mu (μ). In one example, method 300 estimates mu responsive to an empirically determined function that describes mu as a function of wheel slip and torque provided to the wheel. Torque provided via the engine or electric machine and reflected through the driveline including the transmission and torque converter where appropriate to the wheel references the function and the function outputs an estimate of mu. Further, output of the function may be modified for vehicle speed, ambient temperature, and vehicle weight. Method 300 proceeds to 304.

At 304, method 300 determines normal force applied to each vehicle wheel and maximum capable friction torque for each vehicle wheel. In one example, the normal force applied to each wheel may be estimated by the following equations:

$$F_{zfl} = \frac{1}{2}\left(\frac{l_r}{l_f+l_r} \cdot m \cdot g - \frac{h}{l_f+l_r} \cdot m \cdot a_x\right) - \frac{k_f}{k_f+k_r} \cdot \frac{h}{l_w} \cdot m \cdot a_y$$

$$F_{zfr} = \frac{1}{2}\left(\frac{l_r}{l_f+l_r} \cdot m \cdot g - \frac{h}{l_f+l_r} \cdot m \cdot a_x\right) + \frac{k_f}{k_f+k_r} \cdot \frac{h}{l_w} \cdot m \cdot a_y$$

$$F_{zrl} = \frac{1}{2}\left(\frac{l_r}{l_f+l_r} \cdot m \cdot g + \frac{h}{l_f+l_r} \cdot m \cdot a_x\right) - \frac{k_f}{k_f+k_r} \cdot \frac{h}{l_w} \cdot m \cdot a_y$$

$$F_{zrr} = \frac{1}{2}\left(\frac{l_r}{l_f+l_r} \cdot m \cdot g + \frac{h}{l_f+l_r} \cdot m \cdot a_x\right) + \frac{k_f}{k_f+k_r} \cdot \frac{h}{l_w} \cdot m \cdot a_y$$

where $F_{zfl}$ is the normal force applied to the front left wheel, $F_{zfr}$ is the normal force applied to the front right wheel, $F_{zrl}$ is the normal force applied to the rear left wheel, $F_{zrr}$ is the normal force applied to the rear right wheel, $l_r$ is a longitudinal distance from the vehicle's center of gravity to the rear wheels, $l_f$ is a longitudinal distance from the vehicle's center of gravity to the front wheels, $l_w$ is lateral distance between the vehicle's left and right wheels, m is the vehicle mass suspended by the wheel, g is a gravitational constant, h is height of the vehicle's center of gravity from the road, $k_f$ is roll stiffness of the vehicle's front suspension, $k_r$ is the roll stiffness of the vehicle's rear suspension, $a_x$ is vehicle longitudinal acceleration, and $a_y$ is vehicle lateral acceleration. The maximum capable friction torque for the wheels may be estimated via the following equations:

$$Tq\_capFric\_fl = \mu \cdot F_{zfl} \cdot R$$

$$Tq\_capFric\_fr = \mu \cdot F_{zfr} \cdot R$$

$$Tq\_capFric\_rl = \mu \cdot F_{zrl} \cdot R$$

$$Tq\_capFric\_rr = \mu \cdot F_{zrr} \cdot R$$

where Tq_capFric_fl is the maximum capable friction torque for the front left wheel, Tq_capFric_fr is the maximum capable friction torque for the front right wheel, Tq_capFric_rl is the maximum capable friction torque for the rear left wheel, Tq_capFric_rr is the maximum capable friction torque for the rear right wheel, μ is the road coefficient of friction, and R is the tire radius. Method 300 proceeds to 306.

At 306, method 300 determines a desired front and rear axle brake torque distribution. In one example, the front and rear axle distribution of axle brake torque may be determined via an empirically determined function that is referenced via a present rate of vehicle deceleration. The function outputs a front axle brake torque and a rear axle brake torque that is responsive to the present vehicle deceleration rate. Values included in the function may be empirically determined and stored in memory. For example, if the present rate of vehicle deceleration is 1.5 meters/second, the function may output a front axle braking torque of 600 Newton-meters (N-m) and a rear axle braking torque of 400 N-m. In another example, the front and rear axle distribution of axle brake torque is determined via an empirically determined function that is referenced via requested braking torque (e.g., torque requested via a vehicle human driver via the brake pedal). Method 300 proceeds to 308.

At 308, method 300 determines regeneration braking torque (e.g., braking torque provided via electric machines in the driveline including front wheels) limits or upper thresholds not to be exceeded for each driven wheel (e.g., wheels to which an electric machine or engine is coupled) to meet the front and rear axle distribution determined at 306. The regeneration braking torque limits for each driven wheel also complies or is less than the maximum capable friction torques for vehicle wheels as determined at step 304. In one example, the regeneration braking torque for each wheel is given by the following equations:

$$Tq\_brkLimFL = max(Tq\_idealSplit\_fl, Tq\_capFric\_fl)$$

$$Tq\_brkLimFR = max(Tq\_idealSplit\_fr, Tq\_capFric\_fr)$$

$$Tq\_brkLimRL = max(Tq\_idealSplit\_rl, Tq\_capFric\_rl)$$

$$Tq\_brkLimRR = max(Tq\_idealSplit\_rr, Tq\_capFric\_rr)$$

where Tq_brkLimFL regeneration braking torque limit that is not to be exceeded for the front left wheel, Tq_brkLimFR regeneration braking torque limit that is not to be exceeded for the front right wheel, Tq_brkLimRL regeneration braking torque limit that is not to be exceeded for the rear left wheel, Tq_brkLimRR regeneration braking torque limit that is not to be exceeded for the rear right wheel, max is a function that returns a greater of the arguments (since the arguments here Tq_idealSplit_xx and Tq_capFric_xx are negative, the argument with the smallest magnitude is returned, note that the x's are substitutes for the wheel designations), Tq_idealSplit_xx is desired front and rear axle brake torque distribution evenly distributed to the right and left wheels, and Tq_capFric_xx are the maximum capable friction torque for the wheels determined at 304. These values may be described as braking stability limits or upper thresholds for each wheel that are not to be exceeded. Method 300 proceeds to 310.

At 310, method 300 determines a battery charge limit (TQ_battChrgLim) torque and motor torque limits for each electric machine coupled to a wheel (e.g., Tq_mtrLimFL, Tq_mtrLimFR). The battery charge limit torque is an amount of regenerative braking torque the electric machines may provide when supplying a maximum charge power to the battery. In one example, the battery charge limit may be determined via referencing a function that outputs a torque value corresponding to a maximum power that the battery may accept. Method 300 proceeds to 312.

At 312, method 300 determines a requested braking torque. In one example, method 300 determines a requested braking torque via referencing a table or function that describes vehicle braking torque as a function of brake pedal position or force applied to a brake pedal. The table or function includes empirically determined values of desired or requested vehicle braking torque and the table is referenced via brake pedal position or force applied to the brake pedal. Method 300 proceeds to 314.

At 314, method 300 determines regeneration torque for each wheel and the total regeneration torque for on the driven axle. The regeneration torque for each wheel is a torque that is converted into electrical charge and stored to a vehicle battery. The maximum or upper threshold torque limit for the front left wheel is given via the following equation:

$$Tq\_regenMaxFL=max(Tq\_mtrLimFL, Tq\_brkLimFL)$$

$$Tq\_regenMaxFR=max(Tq\_mtrLimFR, Tq\_brkLimFR)$$

where Tq_regenMaxFL is the maximum or upper threshold regeneration torque (e.g., regeneration torque not to be exceeded) for the front left wheel, Tq_regenMaxFR is the maximum or upper threshold regeneration torque for the front right wheel, max is a function that returns a greater of the arguments Tq_mtrLimFL and Tq_brkLimFL, but since the arguments here are negative, the argument with the smallest magnitude is returned.

Method 300 also determines the total regenerative braking torque for the front axle via the following equation:

$$Tq\_regenMaxTot=Tq\_regenMaxFL+Tq\_regenMaxFR$$

where Tq_regenMaxTot is the maximum or upper threshold regenerative braking torque for the front axle that is not to be exceeded. Method 300 proceeds to 316.

At 316, method 300 determines a potential total regeneration torque request via arbitrating between the total brake torque request and the battery charging limit. In particular, method 300 determines the potential total regeneration torque via the following equation:

$$Tq\_regenPotTot=max(Tq\_brkReq, Tq\_battChrgLim, Tq\_regenMaxTot)$$

where Tq_ regenPotTot is the potential total regeneration torque request, max is a function that returns the maximum of value of arguments Tq_brkReq, Tq_battChrgLim, and Tq_regenMaxTot. Method 300 proceeds to 318.

At 318, method 300 determines the maximum (e.g., not to be exceeded) or upper threshold possible regeneration torque for the less capable wheel and for the more capable wheel.

The less capable wheel is the wheel that may provide a lower amount of regenerative braking torque before wheel slip is indicated and the more capable wheel is the wheel that may provide a higher amount of regenerative braking torque before wheel slip is indicated. For example, if the left front wheel may provide 200 N-m of braking torque before wheel slip and the right front wheel may provide 250 N-m of braking torque before wheel slip, the left front wheel is the less capable wheel and the right front wheel is the more capable wheel. The maximum regenerative braking torque for the less capable wheel is given via the following equation:

$$Tq\_regenLessWhl=max(Tq\_regenMaxFL, Tq\_regenMaxFR)$$

where Tq_regenLessWhl is the maximum regenerative braking torque for the less capable wheel, max is a function that returns the maximum value of the arguments Tq_regenMaxFL and Tq_regenMaxFR, but since the arguments here are negative, the argument with the smallest magnitude is returned. The maximum regenerative braking torque for the more capable wheel is given via the following equation:

$$Tq\_regenMoreWhl=min(Tq\_regenMaxFL, Tq\_regenMaxFR)$$

where Tq_regenLessWhl is the maximum regenerative braking torque for the less capable wheel, max is a function that returns the maximum value of the arguments Tq_regenMaxFL and Tq_regenMaxFR, but since the arguments here are negative, the argument with the smallest magnitude is returned. Method 300 proceeds to 320.

Thus, steps 310-318 provide a basis for determining a maximum regeneration torque at each electrically driven wheel of the vehicle, vehicle front wheels in this example. The maximum regeneration torques may then be used to apply feedback and possibly feedforward.

At 320, method 300 judges if feedback and feedforward control should be applied to control regenerative braking. If so, the answer is yes and method 300 proceeds to 330. Otherwise, the answer is no and method 300 proceeds to 360. If the answer is no, feedback without feedforward is applied. Method 300 may choose feedback and feedforward in response to a vehicle configuration.

At 330, method 300 judges if the following condition is present:

$$abs(Tq\_regenPotTot)>2\cdot abs(Tq\_regenLessWhl)$$

where abs is a function that returns the absolute value of arguments Tq_regenPotTot and Tq_regenLessWhl. If the absolute value of Tq_regenPotTot is not greater than 2 times the absolute value of Tq_regenLessWhl, then there is no need to have different regeneration torques for both front wheels because when the regeneration torque of the less capable wheel is provided by each of the front wheels, the potential total regeneration torque request Tq_regenPotTot may be provided. As such, the answer is no and method 300 proceeds to 332. However, if the absolute value of Tq_regenPotTot is greater than 2 times the absolute value of Tq_regenLessWhl, then the answer is yes and method 300 proceeds to 340. A yes answer indicates that torque may not be split evenly between the front right and front left wheels.

At 332, method 300 assigns the same amounts of torque to each wheel. In particular, method 300 assigns wheel torques via the following equations:

$$Tq\_regen1=0.5\cdot TqregenPorTot$$

$$Tq\_regen2=Tq\_regen1$$

where Tq_regen1 is the regeneration torque for the left front wheel, Tq_regen2 is the regeneration torque for the right front wheel. The electric machines coupled to the wheels are commanded to provide Tq_regen1 and Tq_regen2 respectively at the driven front wheels. Method 300 proceeds to 334.

At 334, method 300 determines total friction braking torque for the front axle. In one example, method 300 determines the total friction torque for the axle via the following equations:

Tq_fricTot=Tq_brkReq−(Tq_regen1+Tq_regen2)

where Tq_fricTot is the total friction torque, Tq_brkReq is braking torque requested by the driver, and Tq_regen1 and Tq_regen2 are the regeneration torques for the front left and right wheels. The friction torque may then be applied to the front and rear wheels as a function of vehicle weight distribution and other conditions. Method 300 proceeds to exit.

At 340, method 300 assigns a wheel with the less capable regeneration torque. In particular, method 300 makes the following assignment:

Tq_regenWhl1=Tq_regenLessWhl where Tq_regenWhl1 is the left or right front wheel, whichever has less regenerative braking capability. Method 300 also assigns a wheel with the more capable regeneration torque. Specifically, method 300 makes the following assignment:

Tq_regenWhl2=max(Tq_regenMoreWhl, Tq_regenPotTot−Tq_regenWhl1)

where Tq_regenWhl2 is the potential regeneration torque for the more capable wheel, Tq_regenPotTot is the total potential regeneration torque, and Tq_regenWhl1 is the regeneration torque of the less capable wheel. Method 300 proceeds to 342.

At 342, method 300 estimates a yaw rate (r_YawEst) that may be induced by Tq_regenWhl1 and Tq_regenWhl2. In one example, method 300 estimates yaw rate according to a reference model. The reference model may be described by the following equations:

$$m\ddot{x} = (F_{xfl} + F_{xfr})\cos(\delta) + F_{xrl} + F_{xrr} - (F_{yfl} + F_{yfr})\sin(\delta) + m\dot{\psi}\dot{y}$$

$$m\ddot{y} = F_{yrl} + F_{yrr} + (F_{xfl} + F_{xfr})\sin(\delta) + (F_{yfl} + F_{yfr})\cos(\delta) - m\dot{\psi}\dot{x}$$

$$I_z\ddot{\psi} = l_f(F_{xfl} + F_{xfr})\sin(\delta) + l_f(F_{yfl} + F_{yfr})\cos(\delta) - l_r(F_{yrl} + F_{yrr}) +$$
$$\frac{l_w}{2}(F_{xfr} - F_{xfl})\cos(\delta) + \frac{l_w}{2}(F_{xrr} - F_{xrl}) + \frac{l_w}{2}(F_{yfl} - F_{yfr})\sin(\delta)$$

where δ is the steering angle, m is the vehicle mass, ẍ is longitudinal acceleration, ÿ is lateral acceleration, $F_{xfl}$ is longitudinal tire force at the front left wheel, $F_{xfr}$ is longitudinal tire force at the front right wheel, $F_{xrl}$ is longitudinal tire force at the rear left wheel, $F_{xrr}$ is longitudinal tire force at the rear right left wheel, $F_{yfl}$ is lateral tire force at the front left wheel, $F_{yfr}$ is lateral tire force at the front right wheel, $F_{yrl}$ is lateral tire force at the rear left wheel, $F_{yrr}$ is lateral tire force at the rear right wheel, ψ̇ is the yaw rate, $l_f$ is a longitudinal distance from the vehicle's center of gravity to the front wheels, $l_w$ is lateral distance between the vehicle's left and right wheels, and $I_z$ is the yaw moment of inertia. Method 300 proceeds to 344 after estimating yaw rate.

At 344, method 300 judges if the following conditions are present:

abs(r_YawEst)≤abs(r_YawThr) AND abs(r_YawAct) <=abs(r_YawThr)

where abs is a function that returns the absolute value of arguments r_YawEst and r_YawThr. If the absolute value of r_YawEst is less than the absolute value of r_YawThr, and if the absolute values of r_YawAct (actual measured yaw rate) is less than the absolute value of r_YawYhr, then the answer is yes and method 300 proceeds to 346. Otherwise, the answer is no and method 300 proceeds to 348. The variable r_YawThr may be adjusted responsive the vehicle operating conditions. In one example, r_YawThr is determined via the following function:

r_YawThr=f(steering angle, actual yaw rate, vehicle speed)

where f is a function that returns a yaw rate threshold responsive to arguments steering angle, yaw rate, and vehicle speed. The function f may be comprised of lookup tables holding empirically determined values. The function can be composed of fuzzy logic rules, e.g., a large steering angle at low vehicle speed may accept a medium r_YawThr, and a small steering angle at high vehicle speed may accept a small r_YawThr. Alternatively, the function can be derived from equations, e.g., a desired yaw rate can be calculated as:

$$r_{Yawdes} = \frac{v}{(l_f + l_r) + k_{us}v^2} \cdot \delta$$

where k_us is the vehicle parameter dependent stability factor, and the r_YawThr can be obtained, e,g, as r_YawThr=r_YawDes+r_delta, and r_delta is an acceptable yaw rate difference between the desired and the threshold value, and r_delta can be determined, e.g., via an actual yaw rate based lookup table.

If both r_YawEst and r_YawAct are less than or equal to r_YawThr, then the answer is yes and regeneration torques may be assigned to the electric machines without further modification by proceeding to 346. Otherwise, the answer is no and method 300 proceeds to 348 where a desired difference torque is determined responsive to feedback and feedforward.

At 346, method 300 assigns Tq_regenWhl1 and Tq_regenWhl2 to electric machines coupled to the front vehicle wheels. In particular, method 300 makes the following assignments:

Tq_regen1=Tq_regenWhl1

Tq_regen2=Tq_regenWhl2 where Tq_regen1 is the regeneration torque for the less capable wheel (e.g., whichever of the front left and front right wheels that may provide the least amount of regenerative braking torque before wheel slip), and where Tq_regen2 is the regeneration torque for the more capable wheel (e.g., whichever of the front left and front right wheels that may provide the most amount of regenerative braking torque before wheel slip occurs). The electric machines coupled to the wheels are commanded to provide Tq_regen1 and Tq_regen2 respectively at the driven front wheels. Method proceeds to 350.

At 350, method 300 determines total friction braking torque for the front axle. In one example, method 300 determines the total friction torque for the axle via the following equations:

Tq_fricTot=Tq_brkReq−(Tq_regen1+Tq_regen2)

where Tq_fricTot is the total friction torque, Tq_brkReq is braking torque requested by the driver, and Tq_regen1 and Tq_regen2 are the regeneration torques for the front left and right wheels. The friction torque may then be applied to the front and rear wheels as a function of vehicle weight distribution and other conditions. Method 300 proceeds to exit.

At 348, method 300 determines a desired difference torque for the front wheels via the following equation:

$$Tq\_diffDes=f(r\_YawAct, r\_YawEst, r\_YawThr)$$

where Tq_diffDes is a desired difference torque for the front wheels and f is a function that returns Tq_diffDes responsive to arguments r_YawAct, r_YawEst, and r_YawThr. The function f may apply feedback (r_YawAct−r_YawThr) and feedforward (r_YawEst−r_YawThr) to return the value Tq_diffDes. For example, the function f may add a torque corresponding to (r_YawEst−r_YawThr) and a torque corresponding to (r_YawAct−R_YawThr) to determine Tq_diffDes. Alternatively, a proportional/integral controller of the form Tq_FF=Kpl*(r_YawEst−r_YawThr); Tq_FB=Kp*(r_YawAct−R_YawThr)+Ki*Integmtor (r_YawAct−r_YawThr); Tq_diffDes=Tq_FF+Tq_FB may be applied where Kp is a proportional gain, Ki is an integral gain, and integrator is a numerical integrator of the term (r_YawAct−r_YawThr). Method 300 then assigns torques to the respective electric machines coupled to the front wheels via the following equations:

$$Tq\_regen1=Tq\_regenWhl1$$

$$Tq\_regen2=Tq\_regenWhl1+Tq\_diffDes$$

where Tq_regen1 is the regenerative torque request for the less capable wheel, and where Tq_regen2 is the regenerative torque request for the more capable wheel. The electric machines coupled to the wheels are commanded to provide Tq_regen1 and Tq_regen2 respectively at the driven front wheels. Method 300 proceeds to 350.

In this way, method 300 controls regenerative braking torque for the front wheels responsive to feedback and feedforward control. The feedback helps to ensure that the regeneration torques will not induce an undesirable yaw rate.

At 360, method 300 judges if the following condition is present:

$$abs(Tq\_regenPotTot)>2\cdot abs(Tq\_regenLessWhl)$$

where abs is a function that returns the absolute value of arguments Tq_regenPotTot and Tq_regenLessWhl. If the absolute value of Tq_regenPotTot is not greater than 2 times the absolute value of Tq_regenLessWhl, then there is no need to have different regeneration torques for both front wheels because when the regeneration torque of the less capable wheel is provided by each of the front wheels, the potential total regeneration torque request Tq_regenPotTot may be provided. As such, the answer is no and method 300 proceeds to 332. However, if the absolute value of Tq_regenPotTot is greater than 2 times the absolute value of Tq_regenLessWhl, then the answer is yes and method 300 proceeds to 362.

At 362, method 300 assigns the same amounts of torque to each wheel. In particular, method 300 assigns wheel torques via the following equations:

$$Tq\_regen1=0.5\cdot TqegenPorTot$$

$$Tq\_regen2=Tq\_regen1$$

where Tq_regen1 is the regenerative torque request for the less capable wheel and Tq_regen2 is the regenerative torque for the more capable wheel. The electric machines coupled to the wheels are commanded to provide Tq_regen1 and Tq_regen2 respectively at the driven front wheels. Method 300 proceeds to 364.

At 364, method 300 determines total friction braking torque for the front axle. In one example, method 300 determines the total friction torque for the axle via the following equations:

$$Tq\_fricTot=Tq\_brkReq-(Tq\_regen1+Tq\_regen2)$$

where Tq_fricTot is the total friction torque, Tq_brkReq is braking torque requested by the driver, and Tq_regen1 and Tq_regen2 are the regeneration torques for the front left and right wheels. The friction torque may then be applied to the front and rear wheels as a function of vehicle weight distribution and other conditions. Method 300 proceeds to exit.

At 366, method 300 determines the actual yaw rate of the vehicle at the present time. The actual yaw rate may be determined via the vehicle control system receiving output from inertial sensors 199. Method 300 proceeds to 368.

At 368, method 300 determines a desired difference yaw rate. In one example, the desired difference yaw rate Tq_diffDes is determined via the following equation:

$$Tq\_diffDes=f(r\_YawAct-r\_YawThr)$$

where Tq_diffDes is a desired difference torque for the front wheels and f is a function that returns Tq_diffDes responsive to arguments r_YawAct and r_YawThr. The function f may apply feedback (r_YawAct−r_YawThr) return the value Tq_diffDes. For example, the function f may perform the operation (r_YawAct−r_YawThr) to determine Tq_diffDes. Alternatively, a proportional/integral controller of the form Tq_FB=Kp*(r_YawAct−R_YawThr)+Ki*Integrator (r_YawAct−r_YawThr); Tq_diffDes=Tq_FB may be applied where Kp is a proportional gain, Ki is an integral gain, and integrator is a numerical integrator of the term (r_YawAct−r_YawThr). Method 300 proceeds to 370.

At 370, method 300 assigns torques to the respective electric machines coupled to the front wheels via the following equations:

$$Tq\_regen1=Tq\_regenWhl1$$

$$Tq\_regen2=Tq\_regenWhl1+Tq\_diffDes$$

where Tq_regen1 is the regenerative braking request for the less capable wheel and Tq_regen2 is the regenerative braking request for the more capable wheel. The electric machines coupled to the wheels are commanded to provide Tq_regen1 and Tq_regen2 respectively at the driven front wheels. Method 300 proceeds to 372.

In this way, method 300 controls regenerative braking torque for the front wheels responsive to feedback. The feedback helps to ensure that the regeneration torques converge to desired values.

At 372, method 300 determines torque for applied to the friction brakes. Method 300 determines total friction braking torque for the front axle. In one example, method 300 determines the total friction torque for the axle via the following equations:

$$Tq\_fricTot=Tq\_brkReq-(Tq\_regen1+Tq\_regen2)$$

where Tq_fricTot is the total friction torque, Tq_brkReq is braking torque requested by the driver, and Tq_regen1 and Tq_regen2 are the regeneration torques for the front left and right wheels. The friction torque may then be applied to the front and rear wheels as a function of vehicle weight distribution and other conditions. Method 300 proceeds to exit.

Thus, method 300 provides for a vehicle operating method, comprising: receiving inputs to a controller and estimating yaw rate of a vehicle according to a model via the controller; providing a feedforward control parameter via the estimated yaw rate; and commanding a first electric machine to generate a first regenerative braking torque responsive to the feedforward control parameter. The method further comprises commanding the electric machine to generate the regenerative braking torque in further response to a feedback control parameter. The method includes where the feedback control parameter is determined from an actual vehicle yaw rate. The method includes where the feedforward control parameter is determined from an estimated vehicle yaw rate. The method includes commanding a second electric machine to generate a second regenerative braking torque responsive to a braking stability threshold of the second wheel. The method further comprises commanding the first electric machine and a second electric machine to generate equal regenerative braking torques in response to an absolute value of a total potential regenerative braking torque not being greater that twice an absolute value of a regenerative braking torque of a less capable wheel. The method includes where the less capable wheel is a wheel that begins to slip when a first torque is applied to the less capable wheel, the first torque being less than a second torque that causes a more capable wheel to begin to slip.

Method 300 also provides for a vehicle operating method, comprising: assigning a first wheel as a less regenerative braking capable wheel; assigning a second wheel as a more regenerative braking capable wheel; estimating yaw rate of a vehicle via a model; generating a first regenerative braking torque via a first electric machine not responsive to a feedforward control parameter, the first electric machine mechanically coupled to the first wheel; and generating a second regenerative braking torque via a second electric machine responsive to the feedforward control parameter, the feedforward control parameter responsive to the estimated yaw rate, the second electric machine mechanically coupled to the second wheel. The method further comprises generating a feedback control parameter responsive to an actual vehicle yaw rate. The method further comprises adjusting the second regenerative braking torque in further response to the feedback control parameter. The method further comprises generating the first regenerative braking torque responsive to a battery charging threshold torque. The method further comprises generating the first regenerative braking torque responsive to an upper motor torque threshold. The method further comprises commanding the first electric machine and a second electric machine to generate equal regenerative braking torques in response to an absolute value of a total potential regenerative braking torque not being greater that twice an absolute value of a regenerative braking torque of a less capable wheel. The method includes where the less capable wheel is a wheel that begins to slip when a first torque is applied to the less capable wheel, the first torque being less than a second torque that causes a more capable wheel to begin to slip.

Referring now to FIG. 4, a prophetic operating sequence according to the method of FIGS. 3A-3D is shown. The vehicle operating sequence shown in FIG. 4 may be provided via the method of FIGS. 3A-3D in cooperation with the system shown in FIGS. 1A-2. The plots shown in FIG. 4 occur at the same time and are aligned in time.

The first plot from the top of FIG. 4 is a plot of vehicle braking request versus time. The vertical axis represents vehicle braking request state and a vehicle braking request is present when trace 402 is near the vertical axis arrow. Vehicle braking is not requested when trace 402 is near the horizontal axis. Trace 402 represents the vehicle braking request state. The horizontal axis represents time and time increases from the left side of the figure to the right side of the figure.

The second plot from the top of FIG. 4 is a plot of front right wheel regeneration torque versus time. The vertical axis represents front right wheel regeneration torque magnitude and the magnitude increases in the direction of the vertical axis arrow. The right wheel regeneration torque magnitude is zero at the level of the horizontal axis. Trace 406 represents the right wheel regeneration torque magnitude. Dashed line 404 represents the front right wheel braking stability limits or upper thresholds Tq_brkLimFR. The horizontal axis represents time and time increases from the left side of the figure to the right side of the figure.

The third plot from the top of FIG. 4 is a plot of front left wheel regeneration torque versus time. The vertical axis represents front left wheel regeneration torque magnitude and the magnitude increases in the direction of the vertical axis arrow. The left wheel regeneration torque magnitude is zero at the level of the horizontal axis. Trace 410 represents the left wheel regeneration torque magnitude. Dashed line 408 represents the front left wheel braking stability limits or upper thresholds Tq_brkLimFL. The horizontal axis represents time and time increases from the left side of the figure to the right side of the figure.

The fourth plot from the top of FIG. 4 is a plot of actual vehicle yaw rate versus time. Positive or counter clockwise rotation (e.g., left rotation) is indicted on the plus side of the axis and negative or clockwise rotation is indicated on the negative side of the axis. The magnitude of positive yaw increases in the direction of the vertical axis pointing upward. The magnitude of negative yaw increases in the direction of the vertical axis pointing downward. Dashed lines 414 and 413 represent yaw threshold r_YawThr for positive and negative yaw. Trace 414 represents actual yaw.

The fifth plot from the top of FIG. 4 is a plot of estimated vehicle yaw rate versus time. Positive or counter clockwise rotation (e.g., left rotation) is indicted on the plus side of the axis and negative or clockwise rotation is indicated on the negative side of the axis. The magnitude of positive yaw increases in the direction of the vertical axis pointing upward. The magnitude of negative yaw increases in the direction of the vertical axis pointing downward. Dashed lines 416 and 418 represent yaw threshold r_YawThr for positive and negative yaw. Trace 420 represents estimated yaw.

At time T0, the vehicle is traveling on a road and brakes are not applied. The front right and front left regenerative braking torque values are zero and the actual and estimated vehicle yaw rates are zero.

At time T1, the driver (not shown) applies the brake pedal (not shown) and the braking request is asserted. The front right and front left regenerative braking amounts increase in magnitude in response to the brake pedal being applied. The actual and estimated vehicle yaw rates remain zero. The front right and front left wheel braking stability limits or upper thresholds are at elevated levels indicating a high road surface coefficient of friction. Between time T1 and time T2, the front right and front left wheel braking stability limits or upper thresholds remain constant and the front right and front left regenerative braking torques remain constant. The actual and estimated vehicle yaw rates are zero.

At time T2, the front right wheel braking stability limit is reduced in response to a reduction in the coefficient of friction of the road under the right wheel. The regenerative braking torque of the front right wheel is reduced in response to reducing the magnitude of the front right wheel braking stability limit. The front left wheel braking stability limit continues at it previous level since the coefficient of friction of the road under the right wheel is unchanged. The regenerative braking torque of the left front wheel continues at its previous level and then it decreases in magnitude shortly after time T2 responsive to the actual yaw rate and the estimated yaw rates exceed thresholds 413 and 418. Adjustments to the regenerative braking torque of the left from wheel reduce the actual and estimated vehicle yaw. The front left wheel regenerative braking torque is adjusted responsive to the actual vehicle yaw rate and the estimated vehicle yaw rate. In particular, the actual vehicle yaw rate is used as feedback and the estimated vehicle yaw rate is used to feedforward adjust the front left wheel regenerative braking torque.

At time T3, the magnitude of the actual vehicle yaw is less than threshold 413 so the regenerative braking torque of the front left wheel is maintained at a level that induces less than the threshold amount of vehicle yaw. It should be noted that the regenerative braking torque of the front left wheel is greater than the regenerative braking torque of the front right wheel. This allows the vehicle to recover more of the vehicle's kinetic energy.

At time T4, the braking request is withdrawn and the front right and front left regenerative braking torque values are reduced to zero. The actual vehicle yaw rate and the estimated vehicle yaw rate are zero.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:

receiving inputs to a controller and estimating yaw rate of a vehicle according to a model via the controller;

during a first condition, commanding a first electric machine to a first regenerative braking torque and a second electric machine to a second regenerative braking torque, the first regenerative braking torque a torque of a less capable wheel, the second regenerative braking torque a torque of a more capable wheel, the torque of the less capable wheel based on a normal force, coefficient of friction, and tire radius of the less capable wheel and the torque of the more capable wheel based on a normal force, coefficient of friction, and tire radius of the more capable wheel;

during a second condition, providing a feedforward control parameter via the estimated yaw rate, commanding the first electric machine to the first regenerative braking torque, commanding the second electric machine to a third regenerative braking torque, the third regenerative braking torque responsive to the feedforward control parameter and a feedback control parameter, the feedback control parameter a function of a difference between an actual yaw rate of the vehicle and a threshold yaw rate.

2. The method of claim 1, where the first condition is the estimated yaw rate of the vehicle being less than the threshold yaw rate and the actual yaw rate of the vehicle being less than the threshold yaw rate, and where the second condition is the estimated yaw rate of the vehicle not being less than the threshold yaw rate or the actual yaw rate of the vehicle not being less than the threshold yaw rate.

3. The method of claim 2, where the feedback control parameter is determined from the actual vehicle yaw rate.

4. The method of claim 3, where the feedforward control parameter is determined from the estimated vehicle yaw rate.

5. The method of claim 1, commanding the second electric machine to generate the second regenerative braking torque responsive to a braking stability threshold of a second wheel.

6. The method of claim 1, further comprising commanding the first electric machine and the second electric machine to generate equal regenerative braking torques in response to an absolute value of a total potential regenerative braking torque not being greater than twice an absolute value of a regenerative braking torque of a less capable wheel.

7. The method of claim 6, where the less capable wheel is a wheel that begins to slip when a first torque is applied to the less capable wheel, the first torque being less than a second torque that causes a more capable wheel to begin to slip.

* * * * *